United States Patent [19]

Lin

[11] Patent Number: 5,570,370

[45] Date of Patent: Oct. 29, 1996

[54] FRAME TIMING ACQUISITION METHOD AND SYSTEM FOR CORDLESS TDMA SYSTEMS

[75] Inventor: Hung-Sheng Lin, Chiu-Ju, Taiwan

[73] Assignee: Industrial Technology Research Institute, Taiwan

[21] Appl. No.: 430,601

[22] Filed: Apr. 28, 1995

[51] Int. Cl.$^6$ ........................................ H04J 3/06
[52] U.S. Cl. ........................................ 370/95.3
[58] Field of Search ................... 370/95.1, 95.3, 370/100.1, 105.1, 105.2, 105.4, 108; 375/354, 365, 368

[56] References Cited

U.S. PATENT DOCUMENTS

| | | | |
|---|---|---|---|
| 4,316,284 | 2/1982 | Howson | 370/105 |
| 4,507,779 | 3/1985 | Barner, Jr. et al. | 370/95.3 |
| 5,131,012 | 7/1992 | Dravida | 375/357 |
| 5,299,235 | 3/1994 | Larsson et al. | 370/104.1 X |
| 5,367,544 | 11/1994 | Bruekheimer | 375/368 |
| 5,400,320 | 3/1995 | Tanaka et al. | 370/13 |
| 5,440,561 | 8/1995 | Werronen | 370/105.1 |

OTHER PUBLICATIONS

S. Haykin, Digital Communications, ch. 8 (1988).
L. Couch II, Digital And Analog Communications Systems, 4th ed. pp. 206–223, (1993).

Primary Examiner—Douglas W. Olms
Assistant Examiner—Russell W. Blum
Attorney, Agent, or Firm—Meltzer, Lippe, Goldstein, et al.

[57] ABSTRACT

A frame timing acquisition system and method are provided including a correlator for comparing a first fixed length subsequence of bits of a received bitstream to a predetermined sync word. A CRC check circuit is provided for, in response to the correlator determining that the first fixed length subsequence of bits matches the predetermined sync word, if a third fixed length subsequence of bits of the bitstream is a cyclical redundancy code parity word formed from a second fixed length subsequence of bits of the bitstream. A decision circuit is also provided for identifying boundaries of a frame of the received bitstream in response to the CRC check circuit determining that the third fixed length subsequence of bits is a cyclical redundancy check parity word of the second fixed length subsequence of bits. According to the inventive method and system, a sync word need be identified in only a single slot of the frame in order to acquire the frame timing.

10 Claims, 5 Drawing Sheets

5,570,370

FRAME TIMING ACQUISITION METHOD AND SYSTEM FOR CORDLESS TDMA SYSTEMS

FIELD OF THE INVENTION

The present invention relates to a communication system in which one or more remote portable transceivers communicate with a local base station over arbitrarily allocated channels. The remote portable transceivers communicate with the base station by transmitting and receiving a bitstream which is organized into a particular frame structure including time slots. During each time slot, information is carried for a respective communication channel. Time slots are arbitrarily allocated to communicating portable transceivers as needed. In addition, non-allocated slots typically contain empty bit positions during which time no bits are transmitted. The invention provides a novel method and system which enables the remote devices to synchronize their internal clocks to the frame structure of the base station in the above-described environment.

BACKGROUND OF THE INVENTION

FIG. 1 depicts a communication environment 10. The communication environment 10 may be a cell in a cellular telephone network or an area covered by a cordless telephone system. As shown, a number of remote, portable transceivers 12, 14 and 16 are provided. Each of the portable transceivers 12, 14 and 16 can maintain a separate duplex communication with a base station 18. The portable transceivers 12, 14 and 16 may be cellular telephones and the base station 18 may be a cell base station. Alternatively, the portable transceivers 12, 14 and 16 may be cordless handsets of a cordless telephone and the base station may be the telephone line terminal of the cordless telephone.

In either case, the portable transceivers 12, 14 and 16 are free to move about the environment 10. When desired, a user of a portable transceiver, e.g., the transceiver 12, activates the transceiver 12 and causes it to initiate communication with the base station 18. Once communication is established between the base station 18 and the transceiver 12, the user may obtain access to the line communication network 20 via the portable transceiver 12, the environment 10, the base station 18 and the line network 20.

Generally speaking, it is not desirable to maintain communication between the portable transceivers 12, 14 and 16 and the base station 18 unless the user is operating the portable transceiver 12, 14 or 16 and remains in the environment 10. For instance, if the portable transceiver 12 is communicating with the base station 18, and moves outside of the environment 10, it may be desirable to disengage the communication link between the portable transceiver 12 and the base station 18. Instead, it may be desirable to engage communication between the portable transceiver 12 and a base station at the new environment into which the portable transceiver 12 has moved. Such is the case where a cellular telephone 12 moves from one cell 10 to another. Alternatively, if the user is not utilizing the portable transceiver 12, it is usually desirable to disengage communication between the portable transceiver 12 and the base station 18 to conserve the battery power of the portable transceiver 12. Thus, the number of portable transceivers 12, 14 and 16 which communicate with the base station 18 is dynamic, i.e., varying over time.

With these communication considerations in mind, the manner in which communication is achieved between the portable transceivers 12, 14 and 16 and the base station 18 is now discussed. The portable transceivers 12, 14 and 16 and the base station 18 communicate with each other by transmitting a bitstream which is organized into a frame structure. FIG. 2 shows an illustrative frame 30 according to the Digital European Cordless Telecommunications (DECT) standard. However, the discussion is general enough to apply to the pan-European digital cellular telephone system (GSM), the second generation cordless telephone (CT2) and the U.S. digital cellular system (IS-54). The frame 30 comprises 11,520 consecutive bits of the bitstream. Illustratively, the bit rate of the bit stream is 1152 kbits/sec. Thus, each frame 30 has a duration of 0.01 seconds.

As shown, each frame 30 is divided into 24 time slots 31-0, 31-1, 31-2, . . . , 31-23. Each time slot, e.g., the time slot 31-0, is allocated 480 bit positions, although, as discussed below, bits are not always transmitted during these respective bit positions of a slot.

A "full" time slot 31-0, i.e., a time slot allocated for, and currently utilized in, communication is also shown in greater detail in FIG. 2. Each full time slot 31-0 begins with a 16-bit preamble followed by a predetermined 16-bit synchronization word (referred to herein as a sync word) in the bits designated "S". Next, 48-bit control data is transmitted in the bits designated "A". Such control data may be used to instruct the portable transceivers 12, 14 or 16 or the base station 18 in performing some communication procedure or call set-up step. Following the control data is a 16-bit cyclical redundancy code for the control data, designated "A-CRC." The A-CRC bits are formed from the preceding A control data bits. Following the A bits and the A-CRC are 320 bits of user data designated "B." The B bits contain the actually transmitted data such as data representative of the user's speech. Immediately following the B bits is a 4-bit cyclical redundancy code for the B bits referred to as X-CRC bits (not shown). Next is a copy of the X-CRC bits designated "Z." Finally, 56 guard bits designated "G" are provided to allow for timing uncertainty and frequency switching.

In operation, each of the time slots 31-1, 31-2, . . . , 31-23 is allocated to one half of a duplex communication channel, i.e., for communicating in one direction between the base station 18 and one of the portable transceivers 12, 14 or 16. As shown in FIG. 2, half of the time slots 31-0, 31-1, . . . , 31-11 are allocated to the base station 18 for transmitting information to the portable transceivers 12, 14 and 16, while the other half of the time slots 31-12, 31-13, . . . , 31-23 are allocated to the portable transceivers 12, 14 and 16 for transmitting information to the base station 18. With 24 total time slots, up to 12 duplex communication channels can be supported simultaneously. The allocation of channels and corresponding time slots is not fixed, but rather varies depending on the communication requirements of the system. That is, as the portable transceivers 12, 14 and 16 require communication service, the base station 18 allocates the available channels and slots. Likewise, the base station de-allocates channels which are no longer necessary to maintain communications thereby making those channels available for allocation. Such a time division multiplexing scheme is referred to as time division multiple access (TDMA).

As mentioned above, FIG. 2 depicts the situation where each time slot 31-0, 31-1, . . . , 31-23 is full, i.e., bits are transmitted in each bit position of each time slot. This is not always the case. For instance, not every time slot which is assignable to portable transceivers need be allocated at any one time. In such cases, the bit positions of the non-allocated slot will be empty. However, the base station 18 always transmits "S" and "A" bits for one certain time slot, even if no other slot is allocated to a portable transceiver. Thus, at least one time slot with "S" and "A" bits may be detected by another device during each frame 30.

In such a frame structured communication scheme, it is important that each portable transceiver 12, 14 and 16 be synchronized with the frames (i.e., in relation to the base station 18) initially, when it is desired to initiate a communication, and to maintain such synchronization during communication. The former is referred to herein as "frame timing acquisition" and the latter as "frame timing maintenance." In the GSM and IS-54 systems, one channel is always active for purposes of distributing system information from the base station 18 to the portable transceivers 12, 14 and 16. In such systems, frame timing acquisition, and later call-setup, may be accomplished using this continuously active channel.

However, some systems, such as DECT and CT2 do not have such a continuously active channel or a channel dedicated for this purpose. In such systems, frame timing acquisition is achieved as illustrated in the flow chart of FIG. 3. In a first step 52, the portable transceiver enters the acquisition period wherein certain parameters are initialized. Next, the portable transceiver executes step 54, wherein the portable transceiver performs a bit-by-bit search on the transmitted bitstream for a sequence of bits corresponding to the aforementioned sync word of the S bits. Each time a bit is received, the transceiver executes step 56 to determine if the sequence of the last 16 received bits forms a sync word. If not, the portable transceiver returns to step 54. If a sync word is detected, the transceiver executes step 58 wherein a counter k is set to 0. Next, in step 60, the portable transceiver determines, based on the last received sync word, where the next sync word of the next slot (one frame later, assuming a worst case scenario wherein only the base station is transmitting a single time slot per frame with S and A bits) should occur. That is, the transceiver sets its remote, internal clock to be synchronized with the occurrence of the detected sync word. Furthermore, the portable transceiver monitors the bitstream for such a subsequent occurring slot (one frame later) and determines if another sync word is present at the appropriate bit positions of the bitstream. If not, then the portable transceiver had originally detected some other bit-pattern similar to the sync word (e.g., a subsequence of the B bits which was identical to the sync word) but not the sync word itself. Thus, if no subsequent sync word is found, the portable transceiver returns to step 52 to try to identify an initial sync word. However, if a sync word is detected at the expected location in step 62, then the portable transceiver proceeds to step 64 wherein the counter k is incremented by 1. Next, in step 66, the portable transceiver determines if a predetermined threshold number K of consecutive sync words has been detected (i.e., k≧K). If not, then the portable transceiver returns to step 60. However, if k is greater than or equal to K then the transceiver proceeds to step 68 wherein the slots are monitored to determine which of the slots is the first slot of the frame (and therefore adjacent to the frame start boundary). Once this is determined, the remote clock at the transceiver is considered synchronized to the frames of the bitstream (and therefore the local clock at the base station).

To summarize, the portable transceiver monitors the bitstream, bit-by-bit to attempt to identify an initial sync word. This may in fact be a sync word or a subsequence of the bitstream which is similar to the sync word. If the portable transceiver misidentifies an arbitrary non-sync word portion of the bitstream as an initial sync word, a "false alarm" is said to occur. To ensure that the sync word was in fact received, the portable transceiver attempts to identify K more sync words at an appropriate location in the bitstream, assuming that the initially received pattern was in fact a sync word. If K such sync words are received, then the initially detected subsequence can be presumed to be a sync word of the bitstream and the portable transceiver is synchronized with the time slots of the bitstream. The portable transceiver can therefore easily acquire the frame by determining which time slot is the first slot.

To complicate this conventional procedure, there is a probability that any given received bit may be misidentified, i.e., an originally transmitted logic '0' bit is misidentified by the portable transceiver as a logic '1' bit or an originally transmitted logic '1' bit is misidentified by the portable transceiver as a logic '0' bit. This is referred to as a bit error. (Bit errors occur as a result of a variety of random well known reasons such as thermal drift of bit clocks at the bases station, the portable transceiver, or both, interference noise in the environment, the dynamic movement of physical objects in the environment, etc.) The probability for a bit error can be as high as $p=10^{-3}$ in the communication system 10 of FIG. 1. Such a high probability is tolerable for voice communication. However, if a bit error occurs in a sync word, the likelihood that the sync word may not be detected increases. A failure to detect a sync word, as a result of a bit error therein, is referred to herein as a "miss." To aid in detecting sync words (in steps 54 and 60 of FIG. 3) despite the potential presence of bit errors therein, the portable transceiver does not require matching an exact subsequence of bits of the bitstream to the predetermined copy of the sync word generated therein. Rather, the portable transceiver tolerates a correlation threshold number E of unmatched bits between the received sequence of bits and the predetermined sync word pattern generated in the portable transceiver. If the length of the sync word is N then the probability Q of a miss in detecting the sync word is:

$$Q = \sum_{I=E+1}^{N} \binom{N}{I} \cdot p^I \cdot (1-p)^{N-I} \quad (1)$$

The probability F of a false alarm is given by:

$$F = \frac{1}{2^N} \cdot \left[ \sum_{I=0}^{E} \binom{N}{I} \right] \quad (2)$$

Table 1 represents illustrative values for Q and F during acquisition for different thresholds E.

TABLE 1

| Corr. Thresh. E | Miss Rate | False Alarm Rate |
| --- | --- | --- |
| E = 0 | $1.59 \times 10^{-2}$ | $1.526 \times 10^{-5}$ |
| E = 1 | $1.19 \times 10^{-4}$ | $2.59 \times 10^{-6}$ |
| E = 2 | $5.56 \times 10^{-7}$ | $2.09 \times 10^{-3}$ |
| E = 3 | $3.37 \times 10^{-9}$ | $1.06 \times 10^{-2}$ |

As can be seen, the miss rate decreases with increasing E but the false alarm rate increases with increasing E.

In the case of ordinary time division multiplexing (TDM) transmission via line networks, a prior art frame maintenance method and system have been proposed in U.S. Pat. No. 4,316,284. The system disclosed in this patent is specifically designed for use with the well known DS1 super frame structure which is reproduced in FIG. 4. As shown in FIG. 4, a DS1 super frame consists of 24 frames wherein each frame includes 193 bits. Each frame is separated from a neighboring frame by a framing bit F, subframe signalling information bit M or a cyclical redundancy code bit C. The F-bits, when appended together form a predetermined framing pattern. The C bits, when appended together form a cyclical redundancy code which can be used to verify the accuracy of the framing pattern in an extended super frame following the current extended super frame in which the C bits are contained.

According to this reference, a framing bit pattern is locally generated. In response to a locally generated framing clock, each bit of the locally generated framing pattern is compared to a received bit of the extended super frame of the bitstream, which received bit is believed to be a corresponding framing bit. Whenever two locally generated framing bits out of four do not match the received bits of the bitstream to which they are compared, a loss of frame signal is generated. In addition, a cyclical redundancy code is generated on the bits of a currently received super frame of the received bitstream. In response to a locally generated CRC clock, each bit of the locally generated cyclical redundancy code is compared to a received bit of the extended super frame of the bit stream, which received bit is believed to be a corresponding C bit. Whenever, a predetermined number of CRC errors are detected by means of this comparison, a loss of CRC signal is generated. Note, however, that the bits of a cyclical redundancy code generated in a currently received extended super frame is compared to the C bits of the very next received extended super frame. The generation of either the loss of frame signal or the loss of CRC signal indicates that re-synchronization with the bitstream is necessary. To determine when to initiate a re-synchronization, every bit is tested (concurrently with the above framing and CRC checks) to see if it is a framing bit by appending it to the $772^{nd}$, $1514^{th}$ and $2268^{th}$ received bits preceding the tested bit. The framing pattern thus formed is inputted to a logic circuit to determine if it contains a potentially valid framing pattern of a set of potentially valid framing patterns. If so, a signal is generated to indicate that a valid framing pattern was received. Therefore, in response to the loss of frame or the loss of CRC signals, a frame re-synchronization is initiated when the next potentially valid framing pattern signal is generated.

The prior art method for the DECT and CT2 system are disadvantageous because they require a relatively long time to acquire the frame timing. The long time requirement arises because K+1 consecutive sync words must be identified (i.e., correlated with a predetermined sync word) to acquire the frame time. This time lag is exacerbated by the bit error problem, which introduces the possibilities of misses. As mentioned above, tolerance thresholds can alleviate the miss problem at the expense of the false alarm problem. Note that even in the absence of bit errors and false alarms, if K is set equal to 1, but only the base station is transmitting S and A bits during one time slot each frame (no active use of channels) then at least two frame times are required to acquire frame timing synchronization.

The method and system disclosed in U.S. Pat. No. 4,316,284 are adequate for frame timing maintenance in a receiver which receives a continuously transmitted bitstream from a transmitter in a TDM system. However, this solution is not adequate for the TDMA system described above. First, by definition, the bitstream in the TDMA system does not necessarily always include a continuous sequence of bits. Rather, some bit positions of non-allocated slots will be empty. Second, the bits of the sync word and cyclical redundancy code are not uniformly dispersed over the signal in the above-described TDMA system. Rather, in the TDMA system, the bits of the sync word and cyclical redundancy code are transmitted as words (i.e., aggregated into uninterrupted subsequences) and in bursts.

It is also worthy to point out that U.S. Pat. No. 4,316,284 is directed to the easier problem of frame timing maintenance and not the more difficult problem of frame timing acquisition. That is, the miss and false alarm problem are not as serious in frame timing maintenance as they are in frame timing acquisition. In frame timing maintenance, the probability of a miss is the same as shown in equation (1). However, the probability of a false alarm $F_w$, in a window of length w, is given by:

$$F_w = F \cdot \frac{1-(1-p)^{w-1}}{p} \approx (w-1) \cdot F \text{ for } p \leq .001 \quad (3)$$

$$= \sum_{I=0}^{E} \binom{N}{\frac{N}{2}} \cdot P^{\frac{N}{2}-I} \cdot (1-p)^{\frac{N}{2}+I}$$

Table 2 shows illustrative values for Q and $F_w$ during maintenance for different thresholds E.

TABLE 2

| Corr. Thresh. E | Miss Rate | False Alarm Rate |
|---|---|---|
| E = 0 | $1.59 \times 10^{-2}$ | $9.92 \times 10^{-25}$ |
| E = 1 | $1.19 \times 10^{-4}$ | $7.93 \times 10^{-21}$ |
| E = 2 | $5.56 \times 10^{-7}$ | $2.77 \times 10^{-17}$ |
| E = 3 | $3.37 \times 10^{-9}$ | $5.54 \times 10^{-14}$ |

In comparing tables 1 and 2, it can be seen, even with a correlation threshold of E=3, the false alarm rate in maintenance is far lower than the false alarm rate in acquisition with a correlation threshold of E=0.

Furthermore, it should be noted that the cyclical redundancy code bits contained in a current DS1 super frame are for checking the next extended super frame. Therefore, in the case of frame time acquisition, at least two extended super frame times are necessary to acquire the frame timing. Such an enormous time lag is typically greater than the time lag of the conventional DECT system.

It is therefore an object to overcome the disadvantages of the prior art.

SUMMARY OF THE INVENTION

This and other objects are achieved by the present invention. According to one embodiment, a frame time acquisition method is provided including the steps of:

(a) comparing a first subsequence of received bits of a received bitstream to a predetermined sync word, (b) in response to the first subsequence matching the sync word, determining if a third fixed length subsequence of bits of the bitstream is a cyclical redundancy code parity word formed from a second fixed length subsequence of bits of the bitstream, and (c) in response to determining that the third subsequence is a cyclical redundancy code parity word formed from the second subsequence, identifying the frame boundaries of the received bitstream.

In this method, predetermined knowledge of the structure of the bitstream is exploited, namely, that for every sync word which is transmitted in the bitstream, a specific additional word (second subsequence), and a cyclical redundancy code parity word (third subsequence) generated from the specific additional word, are always transmitted at a predetermined offset from the sync word. Illustratively, in step (a), each time a bit of the bitstream is received, a first subsequence is formed including the most recently received bit and a fixed sequence of the immediately preceding received bits. Step (a) is then executed to determine if the first subsequence is a candidate for the sync word. If so, step (b) is executed to determine that the first subsequence is in fact the sync word by determining if the specific additional word (second subsequence) and cyclical redundancy code parity word generated therefrom (third subsequence) are also present in the received bitstream. The second and third subsequences are then illustratively formed from subsequences of bits of the received bitstream at predetermined offsets from the first subsequence of bits. If the first subsequence is in fact the sync word, then a cyclical redundancy code syndrome generated from the second and third subsequences will indicate that the third subsequence is a cyclical redundancy code parity word generated from the second subsequence. For instance, assuming no bit-errors in the received second and third subsequences, the generated syndrome will indicate that the combination of the second and third subsequences is error-free if the third subsequence is in fact a cyclical redundancy code parity word generated from the second subsequence using the same cyclical redundancy code parameters (e.g., generator polynomial, message word and parity word lengths, etc.). Once the first subsequence is identified as the sync word, the frame boundaries of the received bitstream can be easily identified at a predetermined offset from the first, second, or third subsequence of bits.

According to another embodiment, a system is provided for acquiring frame timing in a TDMA receiver. The frame time acquisition system has a correlator for comparing a first fixed length subsequence of bits of a received bitstream to a predetermined sync word. A CRC check circuit is also provided which receives second and third fixed length subsequences of bits of the bitstream. In response to the correlator determining that the first fixed length subsequence of bits matches the predetermined sync word, the CRC check circuit determines if the third subsequence is a cyclical redundancy parity word that was formed from the second subsequence. The frame time acquisition circuit also has a decision circuit for identifying boundaries of a frame of the received bitstream in response to the CRC check circuit determining that the third subsequence is a cyclical redundancy code parity word formed from the second subsequence.

Illustratively, the frame time acquisition system is also provided with a timing control circuit. The timing control circuit receives a signal from the correlator indicating if the first fixed length subsequence of bits matches the predetermined sync word. If the received signal indicates that the first fixed length subsequence of bits matches the predetermined sync word, the timing control circuit transmits an enable signal to the cyclical redundancy check circuit for enabling the cyclical redundancy check circuit.

In short, a simple method and system are provided for acquiring the frame timing of a received bitstream in a received TDMA system. The system and method provide a "one-shot," frame time acquisition wherein a sync word need be correlated in only a single time slot in order to acquire the frame timing. Thus, frame timing can be acquired much more rapidly, e.g., in as little as a single time slot time.

DETAILED DESCRIPTION OF THE INVENTION

Figure 1:
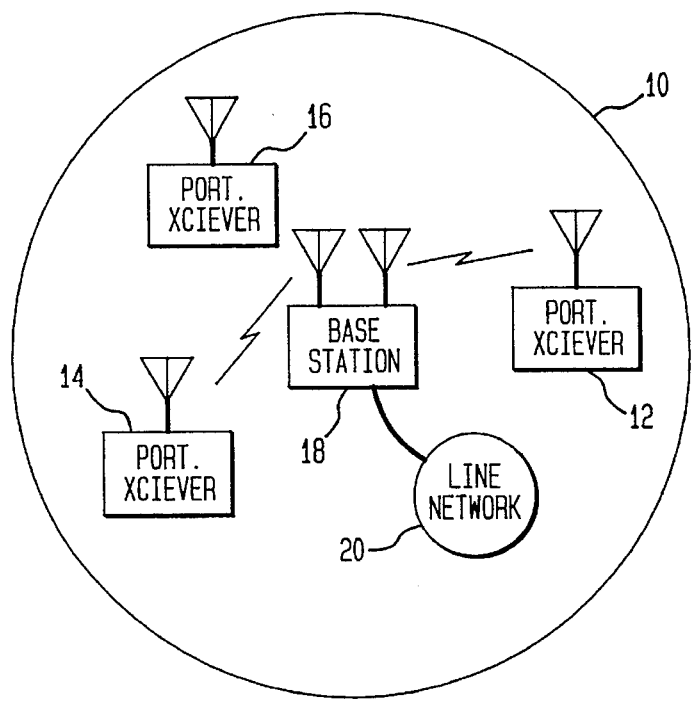
FIG. 1 shows a prior art communications environment.
Figure 2:
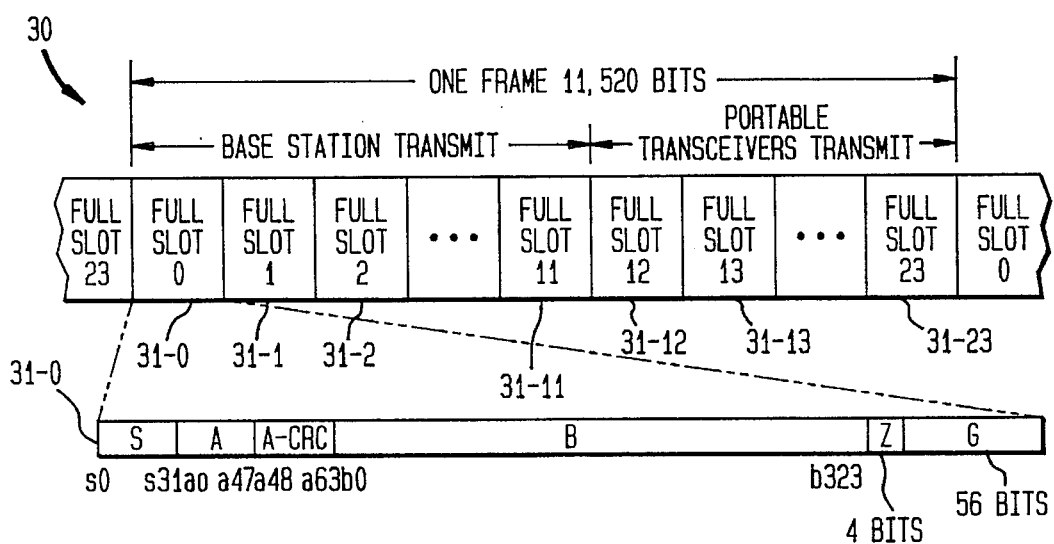
FIG. 2 shows a prior art frame organization according to DECT.
Figure 3:
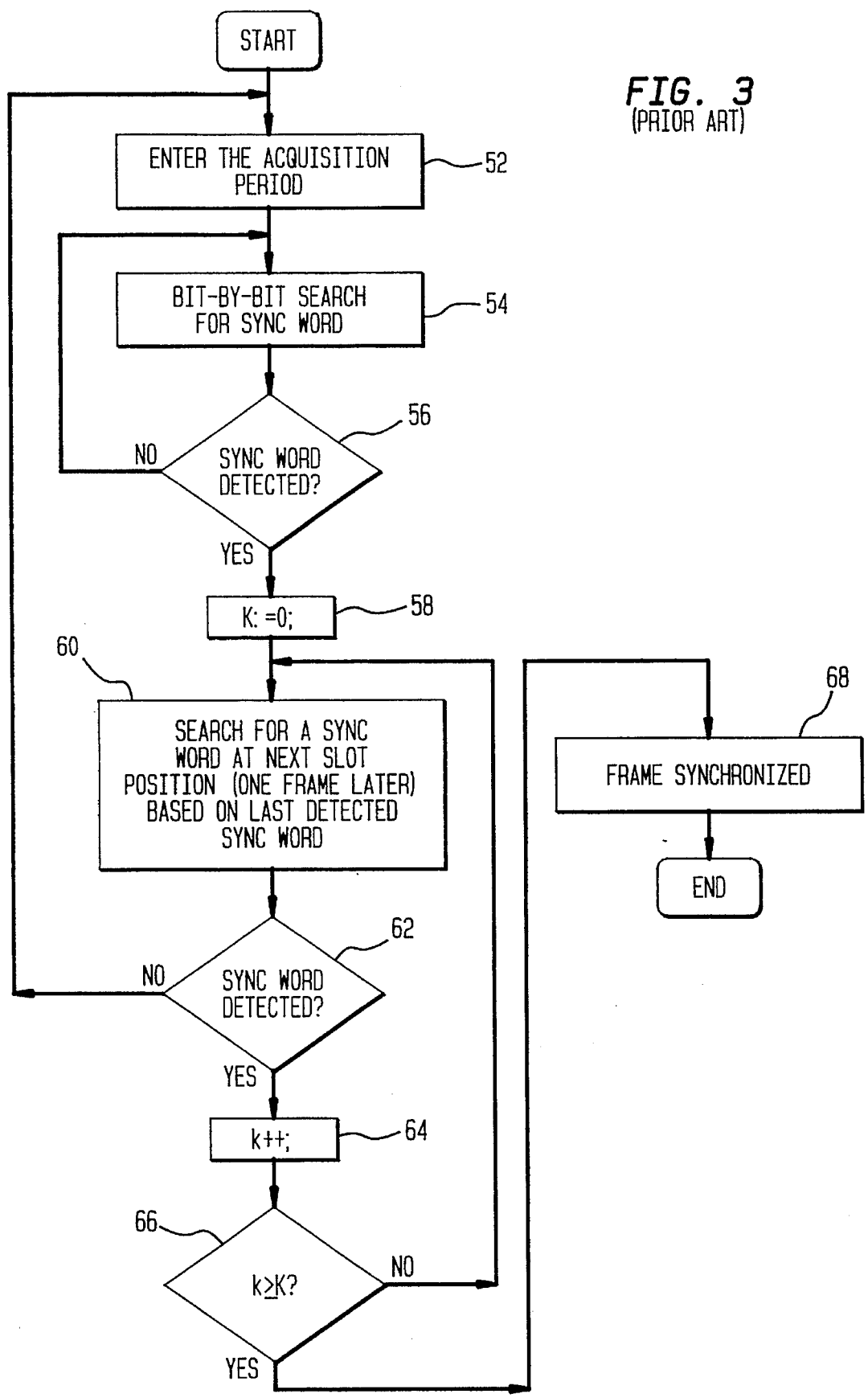
FIG. 3 is a flowchart which schematically illustrates a prior art frame time acquisition method useful in a DECT system.
Figure 4:
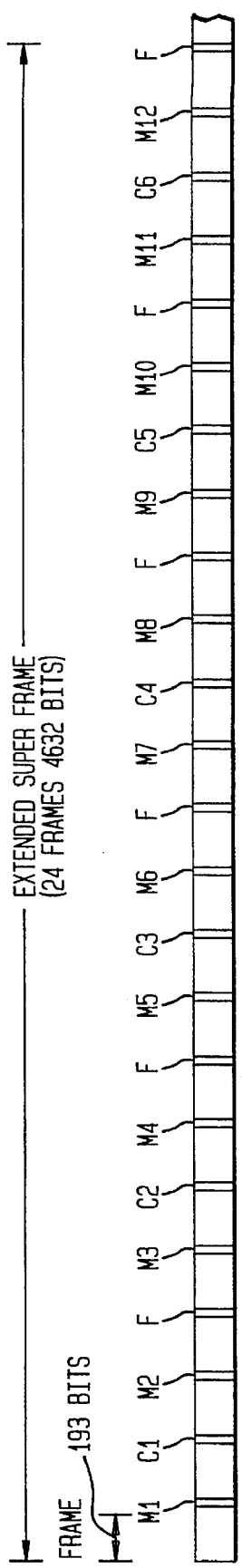
FIG. 4 shows a prior art DS1 super frame.
Figure 5:
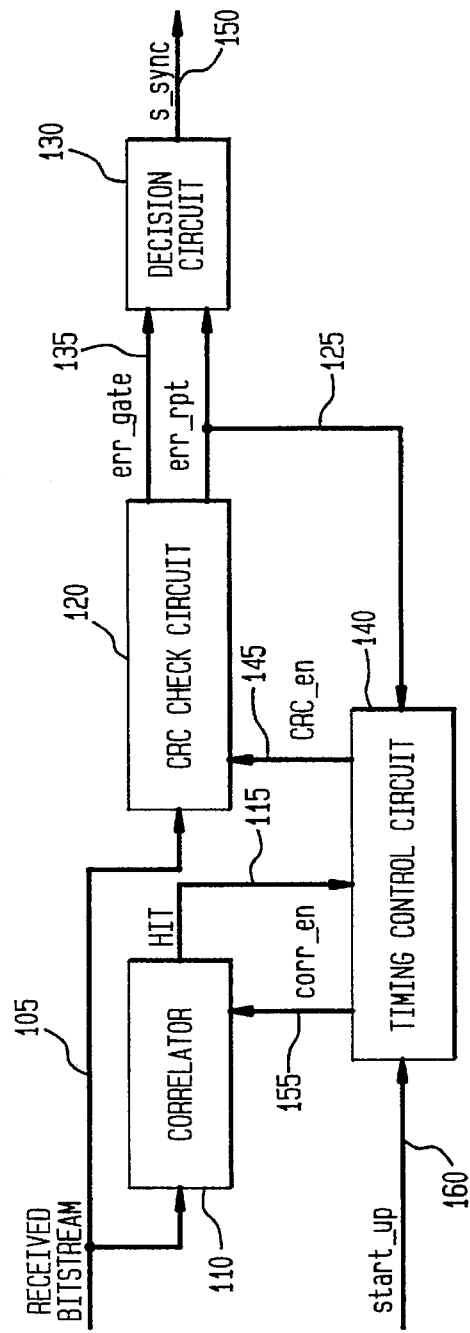
FIG. 5 shows a frame timing acquisition system according to an embodiment of the present invention.

FIG. 5 shows a frame time acquisition system 100 according to one embodiment of the present invention. The frame time acquisition system 100 is illustratively contained within a transceiver, such as the transceiver 12, 14 or 16 (FIG. 1), of a TDMA system in which a bitstream with a frame structure, such as the frame structure 30 (FIG. 2), is transmitted. As shown, a bitstream (which is for example, transmitted from a base station, received at an antenna of the portable transceiver, amplified and demodulated from a carrier signal) is received at an input line 105. The received bitstream is inputted via the line 105 to a correlator 110 and a CRC check circuit 120. As discussed in greater detail below, the correlator 110, when enabled, performs a bit-by-bit search for a first subsequence of the received bitstream which matches a predetermined sync word. Furthermore, the CRC check circuit 120, when enabled, receives a second and a third subsequence, which second and third subsequences are located at predetermined offset bit positions in the bitstream from the first subsequence. The CRC check circuit 120 performs a cyclical redundancy code check on the second and third subsequences to verify that the third subsequence is a cyclical redundancy code parity word formed from the second subsequence using predetermined parameters (discussed below). In response to the cyclical redundancy code check, the CRC check circuit 120 outputs a signal err_gate, via a line 135, and a signal err_rpt, via a line 125, to a decision circuit 130. Based on these signals, the decision circuit 130 generates a signal s_sync on line 150 which s_sync signal indicates the location of the slot boundaries of the frame of the received bitstream. Illustratively, the s_sync signal is received via line 150 at a frame time generator circuit (not shown) of the receiver for use in identifying the frame boundaries.

As shown in FIG. 5, the frame timing acquisition system 100 also includes a timing control circuit 140. The timing control circuit 140 illustratively receives a start_up signal via line 160 from the receiver. Illustratively, the start_up signal is generated when the transceiver is activated. In response to the start_up signal, the timing control circuit transmits a corr_en signal via line 155 to the correlator 110 for enabling the correlator 110. The timing control circuit 140 also receives a hit signal via line 115 from the correlator 110. The hit signal indicates whether or not the most recent received bit of the received bitstream completes a first subsequence which matches the predetermined sync word (and therefore may delineate a sync word in the received bitstream). In response to the hit signal, the timing control circuit 140 transmits a CRC_en signal via line 145 to enable the CRC check circuit 120. Furthermore, the timing control circuit 140 receives the signal err_rpt from the CRC check circuit 120 via line 125.

Figure 6:
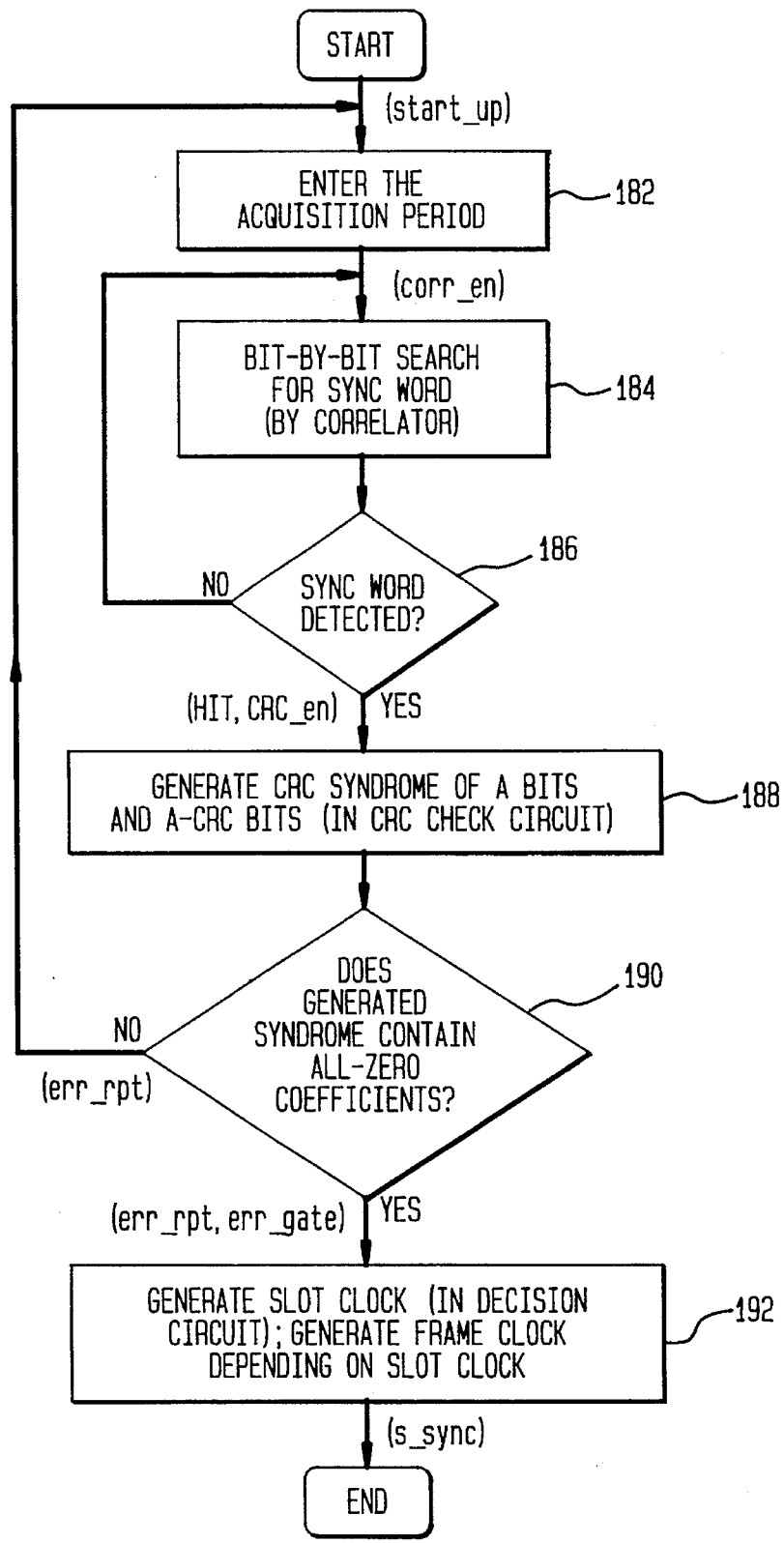
FIG. 6 is a flow chart which schematically illustrates a frame timing acquisition method according to an embodiment of the present invention.

The operation of the invention may be better understood with reference to the flowchart shown in FIG. 6. In a first step 182, the system 100 enters the acquisition period. Illustratively, this is achieved by transmitting an appropriate start_up signal to the timing control circuit 140. As mentioned above, such a start_up signal is transmitted when the transceiver containing the system 100 is activated. During step 182, the timing control circuit 140 is initialized. Next, in step 184, a bit-by-bit search is performed on the bitstream to locate a subsequence of bits which matches a predetermined sync word. In step 186, the system 100 determines if a subsequence has been located which matches the predetermined sync word. If not, execution returns to step 184.

Step 184 is initiated by transmitting an appropriate corr_en signal from the timing control circuit to the correlator 110. Thereafter, steps 184 and 186 are performed by the correlator 110. In step 184, the correlator 110 receives a $j^{th}$ bit $d_j$ of the bitstream. For each $j^{th}$ received bit $d_j$, the correlator 110 extracts a fixed length sequence of y bits $d_{j-y+1}d_{j-y+2} \ldots d_j$ (in step 184) and tests this sequence to determine if it matches the predetermined sync word contained in the correlator 110 (in step 186). For instance, suppose it is known ahead of time that the sync word transmitted in each slot is the y=16 bits long sync word '1110100110001 010' (in left to right order of lowest ordinalled bit to highest ordinalled bit of the bitstream). Suppose the received bit stream contains the following bits: '. . . 1001100111 0100110001010 . . . ' (Before the $j=16^{th}$ bit is received, the timing control circuit illustratively may disable the correlator 110.) Upon receiving the $j=16^{th}$ bit, the correlator 110 extracts the received subsequence '1001100111010011' (i.e., the subsequence beginning with the $j=1^{st}$ received bit and ending with the $j=16^{th}$ received bit) in step 184 and compares it to the predetermined sync word '11101 00110001010' in step 186. Since the subsequence has many differences to the sync word, the correlator does not indicate that a match has occurred. Thus, execution returns to step 184. Next, when the $j=17^{th}$ bit is received, the correlator extracts the received subsequence '001100111 0100110' (beginning with the $j=2^{nd}$ received bit and ending with the $j=17^{th}$ received bit) in step 184 and compares it to the predetermined sync word '1110100110001010' in step 186. Again, because of the many differences, the correlator 110 does not determine that the subsequence matches the predetermined sync word and execution returns to step 184. Steps 184 and 186 are repeatedly executed, in the above-described fashion, until the $j=23^{rd}$ bit of the bitstream is received. Upon receiving the $j=23^{rd}$ bit, the correlator 110 extracts the subsequence '1110100110001010' in step 184 and compares it to the predetermined sync word '1110100110001010' in step 186. Since the two words match, execution proceeds to step 188. In order to enable execution of step 188, the correlator transmits an appropriate hit signal to the timing control circuit 140 which indicates that the last received bit of the bitstream is the trailing bit of a first subsequence which matches the predetermined sync word.

It should be noted that the subsequence corresponding to the $23^{rd}$ bit is identical to the predetermined sync word. However, the subsequence illustratively need not precisely match the predetermined sync word. Rather, the correlator 110 may be designed to tolerate up to a threshold number E of inconsistencies between the extracted subsequence of received bits and the predetermined sync word. This is discussed in greater detail below.

In step 188, the system 100 performs a second check on the bitstream to verify that the most recently received bit delineates the tail end of a sync word of the bitstream. In particular, it is known that second and third subsequences of bits, having respective predetermined, fixed lengths are transmitted at particular respective offsets from the sync word such that the third subsequence is identical to a cyclical redundancy code parity word formed from the second subsequence. For example, in the case of DECT, it is known that the A bits, having 48 total bits, immediately follow the last bit of the sync word and that the A-CRC bits, having 16 total bits, immediate follows the A bits. It is furthermore known precisely how an A-CRC bit subsequence is generated from a given A bit subsequence.

In order to execute step 188, the timing control circuit 140 transmits an appropriate CRC_en signal to enable the CRC check circuit 120. Illustratively, the timing control circuit 140 transmits such a CRC_en signal at an appropriate time in relation to the hit signal indicating that the last received bit of the bitstream is the trailing bit of a subsequence which matches the predetermined sync word (which hit signal was transmitted from the correlator 110 in step 186). In step 188, the CRC check circuit 120 generates a cyclical redundancy code syndrome from the second and third subsequences of bits located at predetermined fixed bit position offsets from the first subsequence of bits. Next in step 190, the CRC check circuit 120 determines if the generated syndrome indicates that the third subsequence is a cyclical redundancy code parity word that was generated from the second subsequence. If the generated cyclical redundancy code syndrome indicates that the third subsequence is not a parity word that was generated from the second subsequence, then it is presumed that a false alarm has occurred and execution returns to step 182. To that end, the CRC check circuit 120 transmits an appropriate err_rpt signal indicating that the third subsequence is not a cyclical redundancy code parity word that was generated from the second subsequence. The err_rpt signal is received at both the decision circuit 130 and the timing control circuit 140.

If, on the other hand, the generated cyclical redundancy code syndrome indicates that the third subsequence is a parity word that was generated from the second subsequence, execution proceeds to step 192. To that end, the CRC check circuit 120 transmits an appropriate err_rpt signal to the decision circuit 130 and timing control circuit 140 to indicate that a match has occurred. Furthermore, if the generated syndrome indicates that the third subsequence is a parity word that was generated from the second subsequence, the CRC check circuit 120 outputs timing information to the decision circuit which is necessary to synchronize the local slot clock to the inputted bitstream. For instance, the err_gate signal may simply be a bit clock which is synchronized to each bit, e.g., using a well known phase-locked loop circuit (not shown), of the received bitstream inputted on line 105.

In step 192, the system 100 generates a slot clock in synchronization with the slots of the bitstream. The slot boundaries may be easily identified since it is known ahead of time the exact bit position of the leading and trailing slot boundaries in relation to the first, second, and third subsequences contained therein. For instance, in the case of the DECT frame structure 30 (FIG. 2) it is known that the next slot begins (the current slot ends) 384 bit positions after the trailing bit of the third subsequence (400 bit positions after the trailing bit of the second subsequence or 448 bit positions after the trailing bit of the first subsequence). The decision circuit 130 may load an internal counter therein with a bit position corresponding to the trailing bit of the third subsequence (i.e., bit position 63) in response to detecting the appropriate signals err__rpt and err__gate. The counter of the decision circuit 130 then counts with each bit clock of the received bitstream up to the maximum bit position of the slot (i.e., bit position 480) and resets its count to 0. Upon resetting the counter, a pulse generator of the decision circuit 130 generates a clock pulse aligned with the slot boundary.

While not shown, additional circuitry may be provided for identifying the frame boundaries in response to the s__sync signal. For instance, knowing where the slot boundaries exists, it is possible to identify information contained in each slot, such as the A bits. Illustratively, the A bits contain control information including, among other things, the ordinality of the slot. Knowing the slot number of the last received slot of the received bitstream and the fixed number of slots per frame, it is possible to identify the trailing boundary of the current frame (leading boundary of the next frame). Circuitry for performing such frame boundary identification in response to the s__sync signal is well within the skill in this art and is not described herein.

Figure 7:
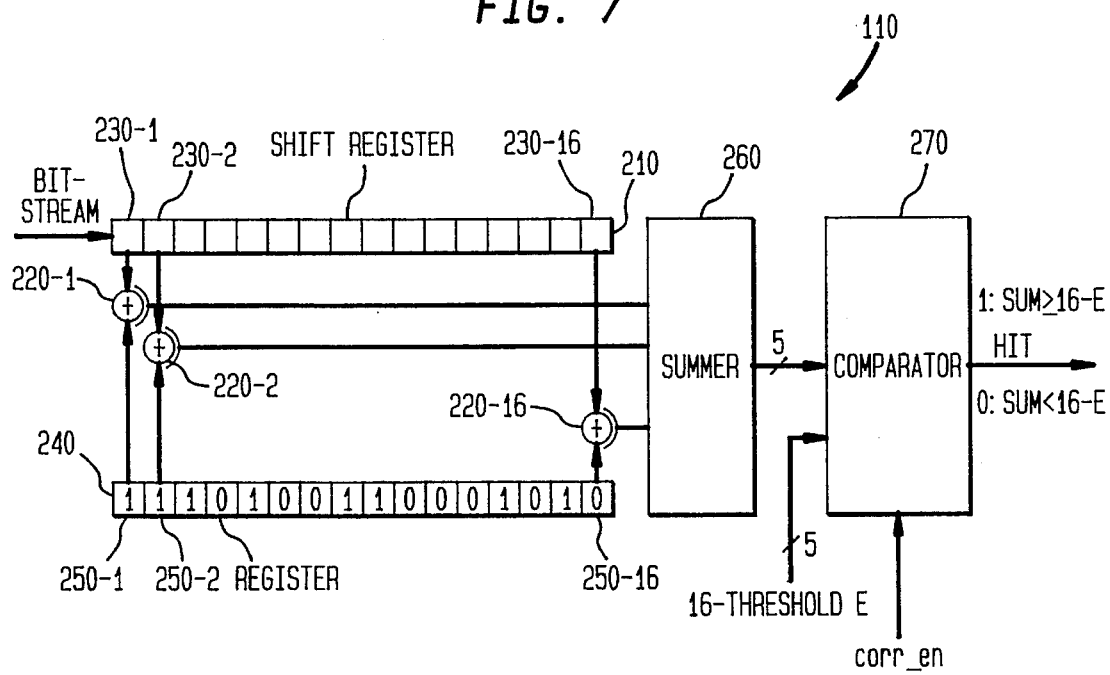
FIG. 7 shows an illustrative correlator of the frame timing acquisition system of FIG. 5.

Referring now to FIG. 7, the correlator 110 is described in greater detail. Illustratively, it is assumed that the predetermined sync word is 16-bits long. As shown, the bits of the received bitstream are shifted into a shift register 210 wherein they are stored in a corresponding storage cell 230-1, 230-2, . . . , 230-16. A second storage register 240 is provided which stores each bit of the predetermined sync word in a corresponding individual storage cell 240-1, 240-2, . . . , or 240-16. Each time a bit of the bitstream is shifted into the shift register 210, a bit-wise comparison is made between the subsequence of the most recent received bits and the predetermined sync word as follows. Each bit of the subsequence stored in a corresponding storage cell 230-1, 230-2, . . . , 230-16 is outputted, in parallel, to a respective XNOR (exclusive-NOR) gate 220-1, 220-2, . . . , or 220-16. Likewise, each of the bits of the predetermined sync word stored in the register 240 is outputted, in parallel, from its respective storage cell 250-1, 250-2, . . . , or 250-16 to a corresponding one of the XNOR gates 220-1, 220-2, . . . , or 220-16. The result of each XNOR operation performed by a respective XNOR gate 220-1, 220-2, . . . , and 220-16 is outputted in parallel to a summer circuit 260. The summer circuit 260 sums the outputs of each XNOR gate to determine the total number of bits of the subsequence which match corresponding bits of the predetermined sync word. (If a bit of the subsequence matches a corresponding bit of the predetermined sync word, the XNOR gate which compares these two bits will output a logic '1'. If they do not match, the XNOR gate will output a logic '0'). The sum is outputted to a comparator 270. The comparator also receives the difference between the total possible number of matches less the threshold tolerable number of mismatches, i.e., 16-E. Furthermore, the comparator also receives the corr__en signal from the timing control circuit. If enabled by the corr__en signal, the comparator outputs a logic '1' hit signal, if the sum is greater than or equal to 16-E, and a logic '0' hit signal, if the sum is less than 16-E. The logic '1' hit signal indicates that the received subsequence matches the predetermined sync word whereas the logic '0' hit signal indicates that the received subsequence does not match the predetermined sync word.

Figure 8:
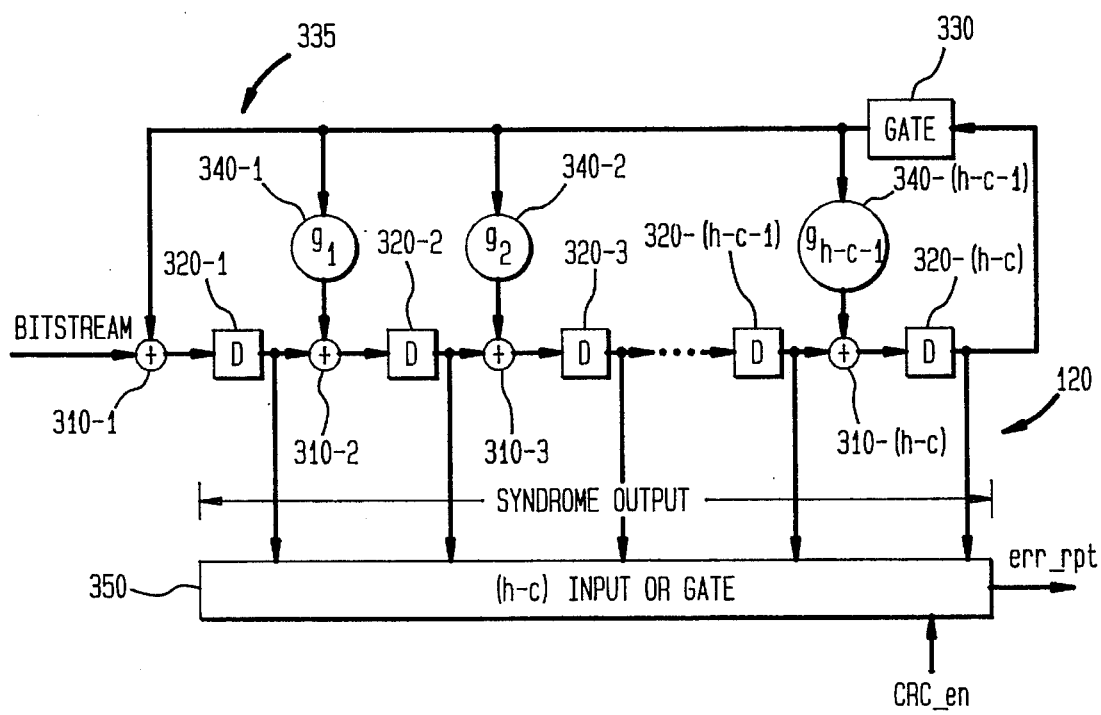
FIG. 8 shows an illustrative CRC check circuit of the frame timing acquisition system of FIG. 5.

Referring to FIG. 8, the CRC check circuit 120 is shown in greater detail. Prior to addressing the structure and operation of the circuit 120, it is advantageous to review basic cyclical redundancy coding theory. While such theory is well known, the usage of terminology in CRC theory can vary.

According to basic CRC theory, a c-bit message represented by the polynomial:

$$m(D) = m_{c-1}, m_{c-2}, \ldots, m_0 \qquad (4)$$

is encoded to produce an (h,c) systematic cyclical code represented by the polynomial x(D), where:

$$x(D) = m_{c-1}, m_{c-2}, \ldots, m_0, b_{h-c-1}, b_{h-c-2}, \ldots, b_0 \qquad (5)$$

As noted in equation (5), x(D) includes the original unaltered message m(D) followed by h-c parity bits $b_{h-c-1}, b_{h-c-2}, \ldots, b_0$. The polynomial x(D) is generated using a predetermined generator polynomial g(D) as follows. Let g(D) be represented by:

$$g(D) = 1 + g_1 D + g_2 D^2 + \ldots + g_{h-c-1} D^{h-c-1} + D^{h-c} \qquad (b\ 6)$$

Note that $g_0$ and $g_{h-c}$ both equal logic '1'. Furthermore, to encode m(D), let:

$$D^{h-c} m(D) = a'(D) g(D) + b(D) \qquad (7)$$

wherein a(D) is a quotient polynomial and b(D) is a remainder polynomial formed by the division of m(D) by g(D). These two polynomials may be represented as:

$$a'(D) = a_0' + a_1' D + \ldots + a_{c-1}' D^{c-1} \qquad (8)$$

and $$b(D) = b_0 + b_1 D + \ldots + b_{h-c-1} D^{h-c-1} \qquad (9)$$

In modulo-2 arithmetic, b(D)=−b(D). Equation (7) may therefore be rearranged as:

$$b(D) + D^{h-c} m(D) = a'(D) g(D) \qquad (10)$$

Note that the polynomial represented by the left hand side of equation (10) is a multiple of the generator polynomial g(D). Therefore x(D) may be set equal to the left hand side of equation (10). The degree of the remainder b(D) is always less than the degree of the divisor g(D) which is h−c. The term $D^{h-c} m(D)$ contains only terms whose exponents are greater to or equal to h−c. Therefore, to generate x(D), the following steps are performed:

(1) Multiplying the message m(D) by $D^{h-c}$,
(2) Dividing $D^{h-c} m(D)$ by the generator polynomial g(D) to produce the remainder (parity bits) b(D), and
(3) Adding b(D) to $D^{h-c} m(D)$ to produce x(D).

The h-bit polynomial x(D) is transmitted via a noisy channel and is detected as an h-bit received polynomial y(D). Since noise may have corrupted the received polynomial y(D), there is no guarantee that y(D) is the same as x(D). To verify the integrity of a message contained in the received polynomial y(D), the following steps are performed. Let y(D) be a polynomial of degree h−1 or less as follows:

$$y(D)=y_0+y_1D+\ldots y_{h-c-1}D^{h-c-1}+y_{h-c}D^{h-c}+y_{h-c+1}D^{h-c+1}+\ldots +y_{h-1}D^{h-1} \quad (11)$$

where $(y_{h-1}, y_{h-2}, \ldots, y_{h-c})$ denotes the received message bits and $(y_{h-c-1}, y_{h-c-2}, \ldots, y_1, y_0)$ denotes the received parity bits of the received code $y(D)$. Define two polynomials $y^{(1)}(D)$ and $y^{(2)}(D)$ as follows:

$$y^{(1)}(D)=y_{h-c}+y_{h-c+1}D+\ldots +y_{h-1}D^{c-1} \quad (12)$$

$$y^{(2)}(D)=y_0+y_1D+\ldots +y_{h-c-1}D^{h-c-1} \quad (13)$$

Note that $y^{(1)}(D)$ represents the received message polynomial and $y^{(2)}(D)$ represents the received parity polynomial. Thus, $$y(D)=D^{h-c}y^{(1)}(D)+y^{(2)}(D) \quad (14)$$

By dividing $D^{h-c}y^{(1)}(D)$ by the generator polynomial $g(D)$ the following is obtained:

$$D^{h-c}y^{(1)}(D)=q(D)g(D)+r(D) \quad (15)$$

where $q(D)$ is a quotient polynomial and $r(D)$ is a remainder polynomial. Define $s'(D)$ such that:

$$s'(D)=r(D)+y^{(2)}(D) \quad (16)$$

If $y(D)$ is received without errors, then $r(D)=y^{(2)}(D)$. In modulo-2 arithmetic, if $r(D)=y^{(2)}(D)$ then the sum of $r(D)$ and $y^{(2)}(D)$ should be zero. That is, for $r(D)=y^{(2)}(D)$ each coefficient $s_0', s_1', \ldots$ of $s'(D)$ equals logic '0'. If the channel introduced any errors into $y(D)$, then $r(D)$ will not equal $y^{(2)}(D)$ and at least one bit of $s'(D)$ will be non-zero, Note that $g(D)$, h and c are predetermined and are available for performing the cyclical redundancy check. Therefore, $y(D)$ can be checked by performing the following steps:

(1) Receiving $y(D)$ and segregating $y(D)$ into the received message polynomial $y^{(1)}(D)$ and the received parity bit polynomial $y^{(2)}(D)$, (2) Multiplying the received message polynomial $y^{(1)}(D)$ with $D^{h-c}$, (3) Dividing the product $D^{h-c}y^{(1)}(D)$ by the generator polynomial $g(D)$ to produce a remainder polynomial $r(D)$, (4) Adding $r(D)$ to the received parity polynomial $y^{(2)}(D)$ to obtain $s'(D)$, and (5) Determining that the received polynomial $y(D)$ contains an error if $s'(D)$ contains any non-zero coefficients or that the received polynomial $y(D)$ is error-free if $s'(D)$ contains only zero coefficients.

This process can be further simplified. Let $a(D)$ denote the quotient polynomial and $s(D)$ denote the remainder polynomial obtained when dividing the received polynomial $y(D)$ by the generator polynomial $g(D)$. Then, $$y(D)=a(D)g(D)+s(D) \quad (17)$$

Herein, the remainder polynomial $s(D)$ is also called the syndrome polynomial. From equation (15):

$$D^{h-c}y^{(1)}(D)=q(D)g(D)+r(D) \quad (15)$$

Adding $y^{(2)}(D)$ to both sides of equation (15) produces:

$$D^{h-c}y^{(1)}(D)+y^{(2)}(D)=q(D)g(D)+r(D)+y^{(2)}(D) \quad (18)$$

Note that the left hand side of equation (18) is equal to $y(D)$. From equation (16) it is known that:

$$s'(D)=r(D)+y^{(2)}(D) \quad (16)$$

By inspection of equations (16) and (18) it can be concluded that $s'(D)$ is the remainder produced when $y(D)$ is divided by $g(D)$. However, as per equation (17), this remainder is $s(D)$. Thus, $s'(D)$ must be equal to $s(D)$ since the remainder of $y(D)$ divided by $g(D)$ is unique. As a result, it can be concluded that the remainder (syndrome) polynomial $s(D)$ produced by dividing $y(D)$ by the generator polynomial $g(D)$ is also the sum of the remainder polynomial $r(D)$ and the parity polynomial $y^{(2)}(D)$. Therefore, a cyclical redundancy check can be performed on a received polynomial $y(D)$ by performing the following simplified steps:

(1) Receiving $y(D)$, (2) Dividing the received polynomial $y(D)$ by the generator polynomial $g(D)$ to produce the syndrome polynomial $s(D)$, and (3) Determining that the received polynomial $y(D)$ is in error if the syndrome polynomial $s(D)$ contains non-zero coefficients and determining that the received polynomial $y(D)$ is error-free if each coefficient of the syndrome polynomial $s(D)$ is zero.

The CRC check circuit 120 performs the above-noted simplified CRC check on the inputted second and third subsequences. The received polynomial $y(D)$ is the combination of the second subsequence and the third subsequence wherein the received message polynomial $y^{(1)}(D)$ is the second subsequence and the received parity polynomial $y^{(2)}(D)$ is the third subsequence. As noted above, there is no guarantee that the S bits will have been detected initially. Thus, arbitrary second and third subsequences, which may, or may not, be the A bits and A-CRC bits are (i.e., an arbitrary polynomial $z(D)$ which may, or may not, be $y(D)$ is) shifted into the CRC check circuit 120. Illustratively, the "message polynomial" $y^{(1)}(D)$ or second subsequence has c=48 bits, the "parity polynomial" $y^{(2)}(D)$ or third subsequence has h−c=16 bits and the combination of the two subsequences or received polynomial $z(D)$ has h=64 bits. The CRC check circuit 120 performs the division $z(D)/g(D)$ to produce a syndrome polynomial $s(D)$, wherein $g(D)$, h and c are predetermined cyclical redundancy code parameters. The syndrome polynomial $s(D)$ is then examined to determine if it contains only zero coefficients or if it contains at least one non-zero coefficient. If the syndrome $s(D)$ contains only zero coefficients then the second and third subsequences are presumed to be the A bits and A-CRC bits, respectively.

The bits of the inputted bitstream (received polynomial $z(D)$) are shifted into a sequence of alternating XOR gates 310-1, 310-2, . . ., 310-(h−c) and 1-bit clock delays 320-1, 320-2, . . ., 320-(h−c). That is, each received bit is inputted to the XOR gate 310-1 and the output of the XOR 310-1 is stored in the delay 320-1. Simultaneously, the value previously stored in the delay 320-1 is inputted to the XOR gate 310-2 and the output of the XOR gate 310-2 is stored in the delay 320-2, and so on. The output of the delay 320-(h−c) is inputted to a feedback path 335 via a gate circuit 330. The purpose of the gate circuit 330 is to control the timing of the feedback path 335 connectivity. In particular, the gate circuit 330 is switched to the open position prior to leading h–c bits of the received polynomial z(D) entering the string of delays 320-1 to 320-(h–c) to prevent garbage bits from being shifted into the feedback path 335. When the leading or $(h-c)^{th}$ bit of the received polynomial z(D) reaches the delay 310-(h–c), the gate circuit 330 is switched to the closed position so that bits in the delay string 320-1 to 320-(h–c) may be shifted through the feedback path 335.

The value of the delay circuit 320-(h–c) outputted via the gate circuit 330 is fed directly as a second input to the XOR gate 310-1 via the feedback path 335. The value of the delay circuit 320-(h–c) is also fed via the feedback path 335 to h–c–1 coefficient generator circuits 340-1, 340-2, . . . , 340-(h–c–1). Each of the coefficient generator circuits 340-1, 340-2, . . . , 340-(h–c–1) generates a coefficient of the generator polynomial g(D). Since each of the generated coefficients is either a logic '0' or logic '1' bit, each coefficient generator circuit 340-1 to 340-(h–c–1) may be simply implemented as a closed circuit connection (for a logic '1' bit) or an open circuit (for a logic '0' bit). The value outputted by each coefficient generator circuit 340-1, 340-2, . . . , 340-(h–c–1) is fed as a second input to one of the XOR gates 310-2, 310-3, . . . , or 310-(h–c), the output of the coefficient generator circuit 340-1 being fed to the XOR gate 310-2, the output of the coefficient generator circuit 340-2 being fed to the XOR gate 310-3, etc.

In this fashion, the XOR gates 310-1, 310-2, . . . , 310-(h–c), the delay circuits 320-1, 320-2, . . . , 320-(h–c) and the coefficient generator circuits 340-1, 340-2, . . . , 340-(h–c) divide an inputted bitstream comprising the second subsequence, followed by the third subsequence, (represented by the polynomial z(D)) by the generator polynomial g(D) to produce the syndrome polynomial s(D). In operation, when the leading (first) bit of the second subsequence (i.e., the leading bit of the received polynomial z(D)) reaches the delay element 320-(h–c), the gate 330 is switched to the closed position thereby enabling the feedback loop 335. All of the bits of the second and third subsequences (i.e., all bits of the received polynomial z(D)) are therefore shifted through the feedback path 335 which generates the syndrome s(D). After the result of XOR-ing the trailing (last) bit of the third subsequence (i.e., of the received polynomial z(D)) and the bit outputted from the delay element 320-(h–c), the delay string 320-1 to 320-(h–c) contains the syndrome polynomial s(D). As noted above, if the third subsequence is the A-CRC bits and the second subsequence is the A bits then z(D)=y(D). If so, then the second subsequence is a received message, i.e., the A bits, and the third subsequence is a received cyclical redundancy code parity word that was originally generated using the generator polynomial g(D), i.e., the A-CRC bits. If the above condition z(D)=y(D) is true, and if the received polynomial y(D) is error-free, then s(D) will contain only zero coefficients. Therefore, if both of the above-noted conditions are true, then each delay 320-1 to 320-(h–c) stores a logic '0'.

The coefficients of the polynomial syndrome s(D) are outputted to an h–c input OR gate 350. The OR gate 350 also receives the CRC_en signal from the timing control circuit 140 (FIG. 5). In response to an appropriate CRC_en signal, the OR gate 350 logically OR's all of its inputs and produces the output signal err_rpt. The OR gate 350 outputs an appropriate err_rpt signal indicating whether or not the second and third subsequences are a message sequence, i.e., the A bits, and the cyclical redundancy code parity word for that message sequence, i.e., the A-CRC bits, respectively. As noted above, if the inputted second and third subsequences (polynomial z(D)) contains a message polynomial $y^{(1)}(D)$ and a parity polynomial $y^{(2)}(D)$ generated using a predetermined generator polynomial g(D), and if z(D) is error-free, then the OR gate 350 produces a logic '0'. If either of these conditions is not true, then the OR gate 350 produces a logic '1'. If the OR gate 350 produces a logic '0', then the received second subsequence is presumed to be the A bits and the received third subsequence is presumed to be the A-CRC bits. The OR gate 350 can be used in conjunction with other circuitry (not shown) to generate the err_gate signal which err_gate signal provides necessary timing information for input to the decision circuit 130.

Thus, a system and method are provided which can very quickly identify the frame boundaries. In a best case scenario (no misses and no false alarms), only a single sync word need be identified in a single time slot. This sync word can be verified during the same time slot. Thus, frame timing can be acquired in as little as a single time slot time. This is possible because the identification of a potential sync word (first subsequence) of a time slot can be verified using only information in the same time slot (second and third subsequences).

In short, a frame timing acquisition system and method are provided. The system includes a correlator for comparing a first fixed length subsequence of bits of a received bitstream to a predetermined sync word. A CRC check circuit is also provided for receiving second and third fixed length subsequences of the inputted bitstream located at predetermined fixed offsets from the first subsequence. In response to the correlator determining that the first fixed length subsequence of bits matches the predetermined sync word, the CRC check circuit determines if the third subsequence is a cyclical redundancy code parity word formed from the second subsequence. A decision circuit is also provided for identifying boundaries of a frame of the received bitstream in response to the CRC check circuit determining that the third subsequence is a cyclical redundancy code parity word formed from the second subsequence of bits. The system and method according to the present invention are capable of identifying frame boundaries after identifying a sync word in only a single slot. Furthermore, the system and method can be used in a TDMA system wherein bits are not necessarily transmitted at every bit position of the bitstream, and where the sync words and cyclical redundancy codes are aggregated in bursts rather than distributed over the bit positions of the frame.

Finally, the above the invention has been described above with reference to specific embodiments. However, this was merely illustrative. Numerous alternative embodiments may be devised by those having ordinary skill in the art without departing from the spirit and scope of the following claims.

The invention claimed is:

1. A frame acquisition method comprising the steps of:

comparing a first fixed length subsequence of bits of a received bitstream to a predetermined sync word, in response to matching said first fixed length subsequence of bits to said predetermined sync word, determining if a third fixed length subsequence of bits of said bitstream is a cyclical redundancy code parity word formed from a second fixed length subsequence of bits of said bitstream, and identifying frame boundaries of said received bitstream in response to determining that said third fixed length subsequence of bits is a cyclical redundancy check parity word of said second fixed length subsequence of bits.

2. The method of claim 1 wherein said bitstream contains empty bit positions during which time no bits are received.

3. The method of claim 1 wherein said frame comprises a plurality of time slots, and wherein said first, second and third subsequences are contained within a single one of said slots of said frame.

4. The method of claim 3 wherein said identified frame boundaries include a slot boundary located within said bitstream at a predetermined offset from said first subsequence.

5. The method of claim 4 wherein said slot boundary is a trailing boundary of a slot containing said first, second and third subsequences.

6. The method of claim 1 wherein said second and third fixed length subsequences are located within said bitstream at respective predetermined fixed offsets from said first subsequence.

7. The method of claim 1 wherein said step of determining further comprises the step of:

generating a cyclical redundancy code syndrome from said second and third fixed length subsequences of bits.

8. The method of claim 7 wherein said step of determining further comprises the step of:

determining that said third fixed length subsequence of bits is a cyclical redundancy code parity word formed from said second fixed length subsequence of bits if each coefficient of said generated cyclical redundancy code syndrome is zero.

9. A system for acquiring frame timing in a TDMA receiver comprising:

a correlator for comparing a first fixed length subsequence of bits of a received bitstream to a predetermined sync word, a CRC check circuit for, in response to said correlator determining that said first fixed length subsequence of bits matches said predetermined sync word, determining if a third fixed length subsequence of bits of said bitstream is a cyclical redundancy code parity word formed from a second fixed length subsequence of bits of said bitstream, and a decision circuit for identifying boundaries of a frame of said received bitstream in response to said CRC check circuit determining that said third fixed length subsequence of bits is a cyclical redundancy check parity word of said second fixed length subsequence of bits.

10. The system of claim 9 further comprising:

a timing generator for receiving a signal from said correlator indicating that said first fixed length subsequence of bits matches said predetermined sync word and transmitting an enable signal to said cyclical redundancy check circuit for enabling said cyclical redundancy check circuit to determine if said third fixed length subsequence of bits of said bitstream is a cyclical redundancy code parity word formed from said second fixed length subsequence of bits of said bitstream.

* * * * *